United States Patent
Li et al.

(10) Patent No.: US 7,333,430 B2
(45) Date of Patent: Feb. 19, 2008

(54) SYSTEMS AND METHODS FOR PASSING NETWORK TRAFFIC DATA

(75) Inventors: Hongwei Li, Burnaby (CA); Michael Xie, Palo Alto, CA (US); Junyin Li, Burnaby (CA); Guangwen Li, Inner Mongolia (CN)

(73) Assignee: Fortinet, Inc., Sunnyvale, CA (US)

( * ) Notice: Subject to any disclaimer, the term of this patent is extended or adjusted under 35 U.S.C. 154(b) by 42 days.

(21) Appl. No.: 11/176,071

(22) Filed: Jul. 6, 2005

(65) Prior Publication Data

US 2007/0008971 A1    Jan. 11, 2007

(51) Int. Cl.
*H04L 12/56* (2006.01)
*G06F 13/00* (2006.01)

(52) U.S. Cl. .......................... 370/230; 710/20; 710/36; 713/154

(58) Field of Classification Search ............... 370/229, 370/230, 389, 477, 352; 713/153, 154, 160, 713/161; 726/1–3, 11–14, 21, 23, 24; 710/20, 710/36
See application file for complete search history.

(56) References Cited

U.S. PATENT DOCUMENTS

| | | | | |
|---|---|---|---|---|
| 5,867,651 A | * | 2/1999 | Dan et al. ................ | 709/203 |
| 5,925,111 A | * | 7/1999 | Nagasawa ................ | 710/17 |
| 6,484,209 B1 | * | 11/2002 | Momirov ................ | 709/238 |
| 6,529,978 B1 | * | 3/2003 | Eide et al. ................ | 710/104 |
| 6,539,439 B1 | * | 3/2003 | Nguyen et al. ............ | 710/52 |
| 6,625,152 B1 | * | 9/2003 | Monsen et al. ........... | 370/392 |
| 6,870,849 B1 | * | 3/2005 | Callon et al. .......... | 370/395.32 |
| 2002/0012319 A1 | * | 1/2002 | Rochberger et al. ....... | 370/229 |
| 2002/0085563 A1 | * | 7/2002 | Mesh et al. ............... | 370/393 |
| 2003/0065812 A1 | * | 4/2003 | Beier et al. ............... | 709/236 |
| 2003/0074473 A1 | * | 4/2003 | Pham et al. .............. | 709/246 |
| 2003/0210688 A1 | * | 11/2003 | Basso et al. ............... | 370/389 |
| 2003/0223413 A1 | * | 12/2003 | Guerrero ................ | 370/389 |
| 2005/0053060 A1 | * | 3/2005 | Pettey ..................... | 370/385 |
| 2005/0135280 A1 | * | 6/2005 | Lam ........................ | 370/260 |
| 2005/0144282 A1 | * | 6/2005 | Argo ....................... | 709/226 |
| 2006/0242299 A1 | * | 10/2006 | Karger et al. ............ | 709/226 |

* cited by examiner

*Primary Examiner*—Chi Pham
*Assistant Examiner*—Ahmed Elallam
(74) *Attorney, Agent, or Firm*—Bingham McCutchen LLP

(57) ABSTRACT

A method for processing network traffic data includes receiving network traffic data, and passing the network traffic data to one of a plurality of worker modules for processing the network traffic data, wherein the step of passing is performed based at least in part on a quantity of the worker modules, and/or a number associated with a first IP address. A system for processing network traffic data includes a first IO module, a second IO module, a first worker module coupled to the first and second IO modules, a second worker module coupled to the first and second IO modules, and a switch module coupled to the first IO module, the second IO module, the first worker module, and the second worker module.

45 Claims, 10 Drawing Sheets

| Reply Packet | | | | 240 |
|---|---|---|---|---|
| IO Module 102 | Worker Module 106a | Worker Module 106b | IO Module 104 | |
| | | | Receive packet from receiver 18 — 242 | |
| | | | Determine module — 244 | |
| | | | Pass packet to Worker Module 106b — 246 | |
| | | Untag packet, and determine logical interface — 248 | | |
| | | Process packet — 250 | | |
| | | Pass packet to Worker Module 106a — 252 | | |
| | Process packet — 254 | | | |
| | Tag packet — 256 | | | |
| | Pass packet to IO module 102 — 258 | | | |
| Untag packet, and determine IO interface — 260 | | | | |
| Send packet to sender 16 — 262 | | | | |

FIG. 2B

| Reply Packet | | | |
|---|---|---|---|
| IO Module 102 | Worker Module 106a | Worker Module 106b | IO Module 104 |
| | | | 342 — Receive packet from receiver 18 |
| | | | 344 — Determine module |
| | | | 346 — Pass packet to Worker Module 106a |
| | 348 — Untag packet, and determine logical interface | | |
| | 522 — IPSEC VPN detunneling (if required) | | |
| | 524 — DNAT (if required) | | |
| | 526 — Stateful inspection | | |
| | 528 — Intrusion detection and prevention (if required) | 350 | |
| | 530 — Antivirus (if required) | | |
| | 532 — SNAT (if required) | | |
| | 534 — IPSEC VPN tunneling (if required) | | |
| | | 352 — Tag packet | |
| | | 354 — Pass packet to IO Module 104 | |
| 356 — Untag packet, and determine IO interface | | | |
| 358 — Send packet to sender 16 | | | |

1
SYSTEMS AND METHODS FOR PASSING NETWORK TRAFFIC DATA

BACKGROUND

1. Field of the Invention

The field of the invention relates to computer systems and computer networks, and more particularly, to systems, and methods for processing network traffic data.

2. Background

A gateway between a user and a server performs many important functions. One important function is policy enforcement. Policy enforcement performed by a gateway product may include, for examples, source verification, destination verification, user authentication, anti-virus, content scanning, content detection, and intrusion detection.

Generally, existing gateway products receive a request for policy enforcement sent by a sender, perform policy enforcement, and then transmit the request to a receiver. In response to the sender's request, the receiver sends a reply back to the gateway, which then performs further policy enforcement. After performing this second policy enforcement, the gateway passes the reply to the user.

Some of the existing gateway products use multiple processors to process packets transmitted between sender and receiver, thereby increasing an efficiency of the gateway products. However, in these gateway products, a tremendous amount of resources is utilized in managing flow of network traffic data that are being processed by the multiple processors. For example, a gateway product may prescribe complex protocols in distributing network traffic data among the processors. These protocols may require a lot of memory and processing time to process, and may render the gateway product unstable. In particular, a protocol may need to do backlog for traffic distribution, which uses a lot of memory. If this is not properly implemented, it may cause memory leak and corruption, which in turn, causes the system to be unstable. For example, if memory is run out, the protocol may either stop distributing traffic or may free previous backlog entry. This may cause service distribution as some traffic are cut.

SUMMARY

In accordance with some embodiments, a method for processing network traffic data includes receiving network traffic data, and passing the network traffic data to one of a plurality of worker modules for processing the network traffic data, wherein the step of passing is performed based at least in part on a quantity of the worker modules.

In accordance with other embodiments, a system for processing network traffic data includes means for receiving network traffic data, and means for passing the network traffic data to one of a plurality of worker modules for processing the network traffic data, wherein the means for passing is configured to perform the step of passing based at least in part on a quantity of the worker modules.

In accordance with other embodiments, a computer product having a set of stored instructions, an execution of which causes a process to be performed, the process includes receiving network traffic data, and passing the network traffic data to one of a plurality of worker modules for processing the network traffic data, wherein the step of passing is performed based at least in part on a quantity of the worker modules.

In accordance with other embodiments, a method for processing network traffic data includes receiving network traffic data, and passing the network traffic data to one of a plurality of worker modules for processing the network traffic data, wherein the step of passing is performed based at least in part on a number associated with a first IP address.

In accordance with other embodiments, a system for processing network traffic data includes means for receiving network traffic data, and means for passing the network traffic data to one of a plurality of worker modules for processing the network traffic data, wherein the means for passing is configured to perform the step of passing based at least in part on a number associated with a first IP address.

In accordance with other embodiments, a computer product having a set of stored instructions, an execution of which causes a process to be performed, the process includes receiving network traffic data, and passing the network traffic data to one of a plurality of worker modules for processing the network traffic data, wherein the step of passing is performed based at least in part on a number associated with a first IP address.

In accordance with other embodiments, a system for processing network traffic data includes a first IO module, a second IO module, a first worker module coupled to the first and second IO modules, a second worker module coupled to the first and second IO modules, and a switch module coupled to the first IO module, the second IO module, the first worker module, and the second worker module.

Other aspects and features will be evident from reading the following detailed description of the embodiments.

BRIEF DESCRIPTION OF THE DRAWINGS

The drawings illustrate the design and utility of various embodiments, in which similar elements are referred to by common reference numerals. In order to better appreciate how advantages and objects of the embodiments are obtained, a more particular description of the embodiments will be illustrated in the accompanying drawings.

FIG. 2B illustrates a method for processing network traffic data in accordance with other embodiments;

FIG. 5B illustrates a method for processing network traffic data in accordance with other embodiments.

DETAILED DESCRIPTION

Figure 1:
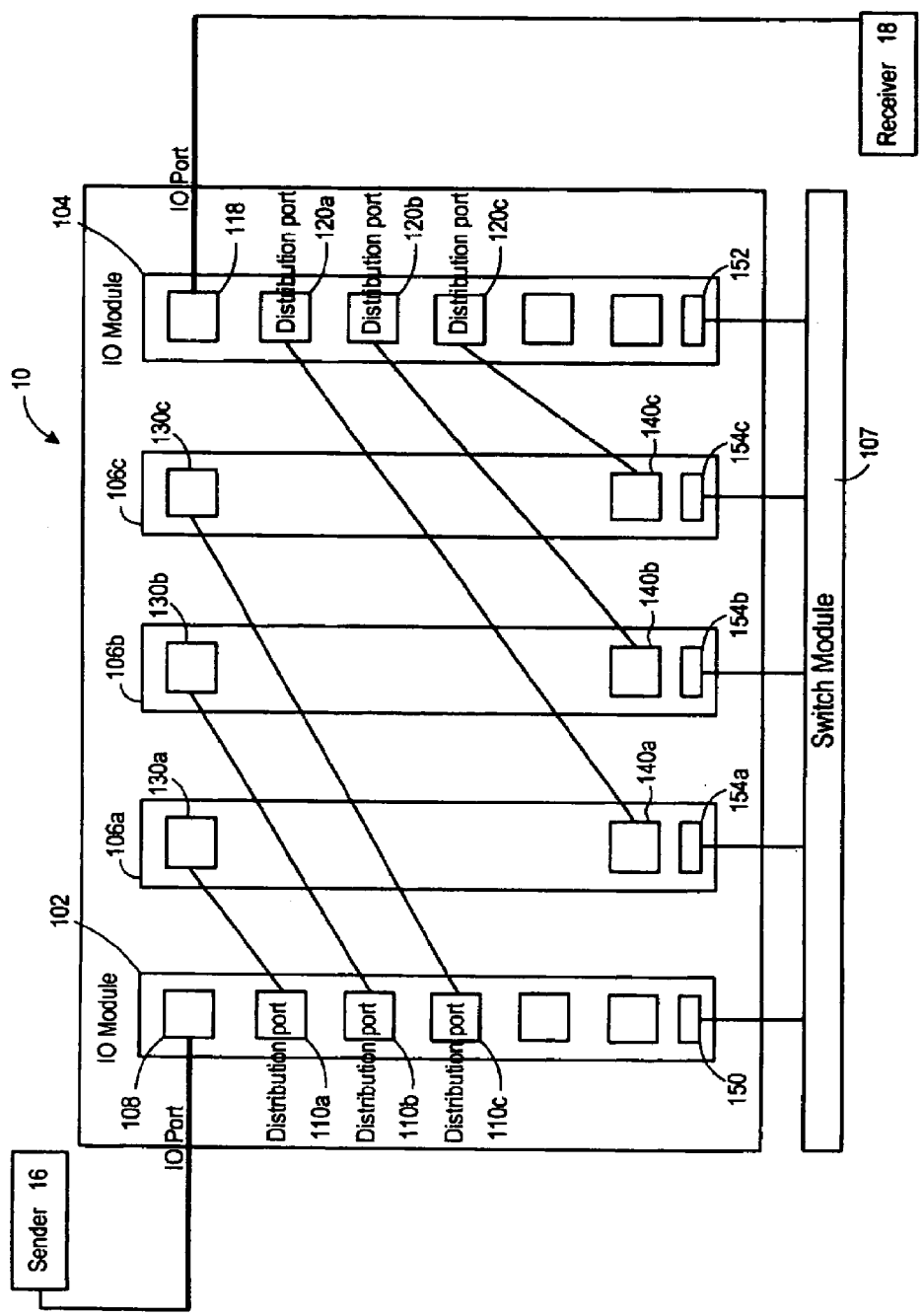
FIG. 1 illustrates a system for processing network traffic data in accordance with some embodiments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of embodiments. They are not intended as an exhaustive description of the invention or as a limitation on the scope of the invention. In addition, an illustrated embodiment may not show all the aspects or advantages. An aspect or an advantage described in conjunction with a particular embodiment is not necessarily limited to that embodiment and can be practiced in any other embodiments, even if not so illustrated or described.

FIG. 1 illustrates a processing system 10 for processing network traffic data in accordance with some embodiments. As used in this specification, the term "network traffic data" refers to data that are transmitted between a sender and a receiver, and should not be limited by any definition of the word "network" and/or the word "traffic." System 10 is configured to receive network traffic data, such as a packet, from a sender 16, and process the network traffic data based on a prescribed protocol before passing the network traffic data to a receiver 18. In some embodiments, the network traffic data from sender 16 is a request for information to be retrieved from receiver 18. In such cases, system 10 may also receive data from receiver 18, and transmits the data to sender 16 in response to the information request.

In the illustrated embodiments, system 10 includes a first IO module 102, a second IO module 104, worker modules 106a-106c, and a switch module 107 coupled to worker modules 106a-106c. System 10 is configured to load balance network traffic data among worker modules 106a-106c. In some embodiments, IO module 102 receives network traffic data from sender 16, and transmit the data to worker module(s) 106. Worker module(s) 106 processes the data and transmits the data to IO module 104, which then passes the data to receiver 18. In other embodiments, IO module 104 receives network traffic data from receiver 18, and transmit the data to worker module(s) 106. Worker module (s) 106 processes the data and transmits the data to IO module 102, which then passes the data to sender 16. Although three worker modules 106a-106c are shown, in other embodiments, the system 10 can have less than three worker modules 106 (e.g., one or two), or more than three worker modules 106.

As shown in the figure, IO module 102 includes an IO port 108 and three distribution ports 110a-110c, and IO module 104 includes an IO port 118 and three distribution ports 120a-120c. Worker modules 106a-106c includes first data ports 130a-130c and second data ports 140a-140c, respectively. Distribution ports 110a-110c of IO module 102 are communicatively coupled (e.g., via point-to-point links) to first data ports 130a-130c of worker modules 106a-106c, respectively. Distribution ports 120a-120c of IO module 104 are communicatively coupled (e.g., via point-to-point links) to second data ports 140a-140c of worker modules 106a-106c, respectively. In other embodiments, IO module 102 can have more than one IO port 108, and IO module 104 can have more than one IO port 118. Also, in other embodiments, IO module 102 can have more or less than three distribution ports 110, and IO module 104 can have more or less than three distribution ports 120. In further embodiments, worker modules 106 can each have more than two data ports.

In the illustrated embodiments, switch module 107 is a layer-two (L2) switch, and is used for exchanging packet between worker modules 106. Alternatively, switch module 107 can be other types of switch in other embodiments. As shown in the figure, IO modules 102, 104 include switch ports 150, 152, respectively, which allow IO modules 102, 104 to communicate with switch module 107, e.g., via communication link(s). Worker modules 106a-106c include switch ports 154a-154c, respectively, which allow worker modules 106a-106c to communicate with switch module 107, e.g., via communication link(s). In the illustrated embodiments, IO modules 102, 104 are coupled to switch module 107 so that information, such as management protocol, configuration data, or network traffic data, can be passed from IO module 102 or IO module 104 to worker modules 106, and vice versa. In other embodiments, the IO modules 102, 104 are not connected to switch module 107. In some embodiments, after network traffic data is processed by one of the worker modules 106a-106c, the network traffic data can be passed to another one of the worker modules 106a-106c (using switch module 107) for further processing. In other embodiments, network traffic data is processed by only one of the worker modules 106a-106c. In such cases, network traffic data received by a worker module 106 from one of the IO modules 102, 104 is processed by the worker module 106, and is then transmitted to the other one of the IO modules 102, 104.

In some embodiments, each worker module 106 has one or more logical interfaces associated with each of its data ports 130, 140. Each logical interface is a protocol used to associate data received from an IO port 108 of IO module 102 (or an IO port 118 of IO module 104) with data ports 130 (or 140). As such, each logical interface of worker module 106 is provided a one-to-one mapping with IO port 108 of IO module 102, or IO port 118 of IO module 104. In IO module 102 (or 104), a packet received by IO port 108 (or 118) is distributed to worker module 106 via a point-to-point link. In worker module 106, the received packet is assigned to a logical interface associated with the IO port 108 (or 118) at which the packet is received at IO module 102 (or 104), and the received packet is treated as if it is received from a corresponding logical port of worker module 106. In other embodiments, IO module 102 and IO module 104 have a plurality of IO ports 108 and IO ports 118, respectively. In further embodiments, each worker module 106 can have a plurality of data ports 130 and/or data ports 140. In such cases, each logical interface provides a one-to-one mapping between an IO port 108 (or 118) and a data port 130 (or 140).

In some embodiments, the mapping between a logical interface at worker module 106 and an IO port (interface) 108 at IO module 102 (or IO port 118 at IO module 104) is implemented as a tag mechanism. In such cases, a pair of IO interface and logical interface are assigned with a tag that is unique among the interface mappings. For example, for the case in which IO module 102 receives network traffic data (e.g., a packet) from sender 16, before the packet is sent from IO module 102 to worker module 106, the tag of IO interface is added to the packet. When worker module 106 receives the packet, the corresponding logical interface is determined, and the tag is removed from the packet. Worker module 106 then processes and treats the packet as if the packet is received via the logical interface. Before worker module 106 passes the packet to IO module 104 (or to another worker module 106), the tag of the logical interface is added to the packet. When IO module 104 (or another worker module 106) receives the packet, the IO interface at IO module 104 is determined via the tag, and the tag is removed. The untagged packet is then transmitted to receiver 18. Similar technique is used when data is transmitted from receiver 18 to sender 16.

To illustrate the above technique, assuming, for example, that ports 108a, 108b of IO module 102 have identifiers io1, io2, respectively, and that two logical interfaces at IO module 102 are labeled as lg1, lg2, the mapping relationship in this example may be io1-lg1, io2-lg2. The tag numbers for the mapping interfaces are 0, 1, respectively. In this example, network traffic data received via port 108a (with identifier io1) at IO module 102 is sent to a worker module 106, and is tagged as (0,packet). Worker module 106 receives the tagged packet, finds logical interface lg1 based on the mapping relationship io1-lg1, and assigns the packet to the logical interface lg1. In some cases, after worker module 106 has processed the received packet, worker module 106 then sends the packet to IO module 104. Module 104 receives the packet and assigns a logical interface for the packet using the above tagging technique, and sends the packet to receiver 18 using the assigned logical interface.

In other embodiments, system 10 does not use the above-described tagging mechanism. Instead, system 10 uses other techniques known in the art to accomplish the same result.

In the illustrated embodiments, system 10 is implemented as a component of a gateway (or gateway product), which is configured to perform policy enforcement. As used in this specification, the term "policy enforcement" refers to a process or procedure, an execution of which creates a result that can be used to determine whether to pass data to user, and includes (but is not limited to) one or a combination of: source verification, destination verification, user authentication, virus scanning, content scanning (e.g., scanning for undesirable content), and intrusion detection (e.g., detecting undesirable content, such as worms, porno website, etc.). In other embodiments, instead of being a component of gateway, system 10 can be a separate component that is coupled to gateway. In other embodiments, system 10 can be a gateway product by itself, and can be implemented at any point along a communication path between sender 16 and receiver 18. For example, in some embodiments, system 10 can be implemented as a device, or a network of devices, that are communicatively coupled between sender 16 and receiver 18. The term "sender" should not be limited to a human sender, and may include a server, a module, a device, a computer program, and the like, e.g., any one of a variety of devices that can transmit information. Similarly, the term "receiver" should not be limited to a server, and may include a hardware, a database, a module, a device, a computer program, and the like, e.g., any one of a variety of devices that can receive information. In some embodiments, sender 16 can also receive information, and receiver 18 can also transmit information.

In some embodiments, IO module 102, IO module 104, worker modules 106, and switch module 107 can each be implemented using a computer. Alternatively, more than one component of system 10 can be implemented using a computer. For example, in other embodiments, IO module 102 and worker module 106a may be implemented using a computer. As another example, IO module 102 and switch module 107 may be implemented using a computer.

It should be noted that system 10 should not be limited to the configuration described previously, and that system 10 can have other configurations in other embodiments. For example, in other embodiments, system 10 can be implemented using software. For examples, system 10 can be implemented using software that is loaded onto a computer, a server, or other types of memory, such as a disk or a CD-ROM. In some cases, system 10 can be implemented as web applications. In alternative embodiments, system 10 can be implemented using hardware. For example, in some embodiments, system 10 includes an application-specific integrated circuit (ASIC), such as a semi-custom ASIC processor or a programmable ASIC processor. ASICs, such as those described in Application-Specific Integrated Circuits by Michael J. S. Smith, Addison-Wesley Pub Co. (1st Edition, June 1997), are well known in the art of circuit design, and therefore will not be described in further detail herein. In still other embodiments, module 10 can be any of a variety of circuits or devices capable of performing the functions described herein. For example, in alternative embodiments, system 10 can include a general purpose processor, such as a Pentium processor. In other embodiments, system 10 can be implemented using a combination of software and hardware. In some embodiments, system 10 may be implemented as a firewall, a component of a firewall, or a component that is configured to be coupled to a firewall.

Figure 2A:
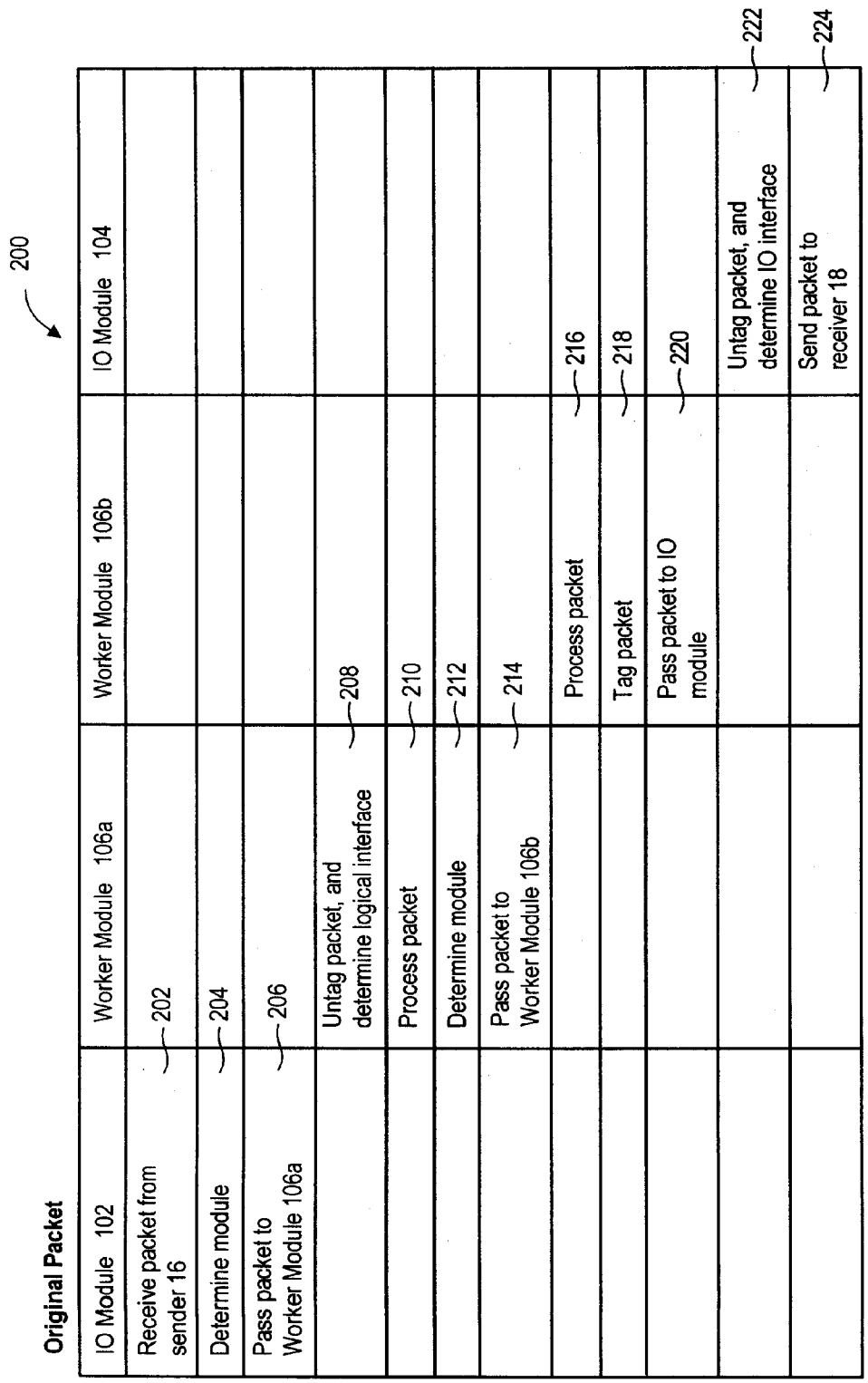
FIG. 2A illustrates a method for processing network traffic data in accordance with some embodiments.

FIG. 2A illustrates a method 200 for processing network traffic data using system 10 in accordance with some embodiments. In particular, method 200 is used to process network traffic data transmitted from sender 16 to receiver 18. First, IO module 102 of system 10 receives a packet (an example of network traffic data) from sender 16 via IO port 108 (Step 202). For the purpose of the following discussion, it is assumed that the packet received is associated with a request for content, such as a web page requested by sender 16. However, it should be understood by those skilled in the art that method 200 of FIG. 2A can be used to process other types of network traffic data. After packet has been received, IO module 102 then determines which of the worker modules 206 to pass the packet and tags the packet (Step 204).

Various distribution algorithms may be used to determine which of the worker modules 206 to pass the packet. In the illustrated embodiments, system 10 determines which of the worker modules 106 to pass the packet based on one or more IP addresses associated with the packet. In some embodiments, the sender's IP address associated with the packet and the receiver's IP address may be used to calculate a value V. For example, the sender's IP address and the receiver's IP address may be added to obtain the value V. In another example, one or both of the receiver and sender's IP addresses may be modified (e.g., by a weight value) before being used to calculate V. Regardless of how the value V is calculated/obtained, a distribution algorithm can be employed in which the value V is divided by a number N that represents a quantity of the worker modules 106 to obtain a remainder R (an assignment number). The number N can be determined by a system administrator. In other embodiments, the number N is determined automatically by a processor. For example, the number N can be determined by considering worker modules 106 that are available for processing network traffic data. After the remainder R is obtained, the remainder R is then used to determine which of the three worker modules 106 to assign for processing the packet. In one example, assuming that V=99, and the number N is "3" (because there are three worker modules 106a-106c), the remainder R="0" (remainder of V/N). In the illustrated embodiments, worker modules 106a-106c are each associated with an identification number A selected from N−1 to 0 (which corresponds to "2" "1" and "0" in the example). For example, worker modules 106a-106c can have identification numbers "0" "1" and "2", respectively. IO module 102 then transmits the packet to the worker module 106 which has an identification number A that matches the calculated remainder R. In the above example, since the calculated remainder R is "0," IO module 102 determines worker module 106a (which has an identification number A of "0") is the worker module 106 for processing the packet.

Determining which worker module(s) 106 to pass the packet for processing based on its associated IP address(es) is advantageous because it allows system 10 to distribute sessions efficiently without the need, or at least without incurring significant system resources, to keep track of resource availability (which can consume a significant amount of computational and management resources). Passing the packet based on its associated IP address(es) is also simple and stable because no information about resource situation needs to be exchanged among modules 102, 104, 106, and there is no resource requirement on IO modules 102, 104.

It should be noted that instead of the example of distribution algorithm described previously, system 10 can be implemented to distribute/pass network traffic data using other distribution algorithms in other embodiments. For example, in other embodiments, instead of obtaining remainder R, system 10 can use one or more IP address(es) to obtain other assignment numbers using other calculation algorithms. Also, in other embodiments, instead of associating each worker module 106 with an identification number A selected from N−1 to 0, system 10 can associate worker modules 106 with other identification numbers A. In further embodiments, system 10 can be configured to map (e.g., using a mapping table) calculated assignment numbers with identification numbers of worker modules 106, to thereby determine which of the worker modules 106 to send the packet for processing.

Next, IO module 102 tags the packet, and passes the tagged packet to the worker module 106 as determined in step 204 (Step 206). Following the above example, IO module 102 passes the packet to worker module 106a. In particular, the packet is passed from distribution port 110a of IO module 102 to data port 130a of worker module 106a via a communication link (e.g., a point-to-point link). In the illustrated embodiments, the packet is tagged by inserting a tag (e.g., an identification) to the packet (e.g., to a front of the packet). Alternatively, other methods of tagging the packet can also be used.

After worker module 106a receives the tagged packet, worker module 106a then untags the packet (e.g., by removing the tag attached to the packet), and determines a logical interface (Step 208). Worker module 106a then processes the packet (Step 210). For example, worker module 106a may perform source verification, destination verification, user authentication, anti-virus, content scanning, content detection, intrusion detection, or other functions associated with policy enforcement. Worker module 106a may also classify the packet based on a result of the processing from Step 210. For example, worker module 106a may determine that packet is "unsafe" or "high risk" based on a prescribed protocol.

Figure 3A:
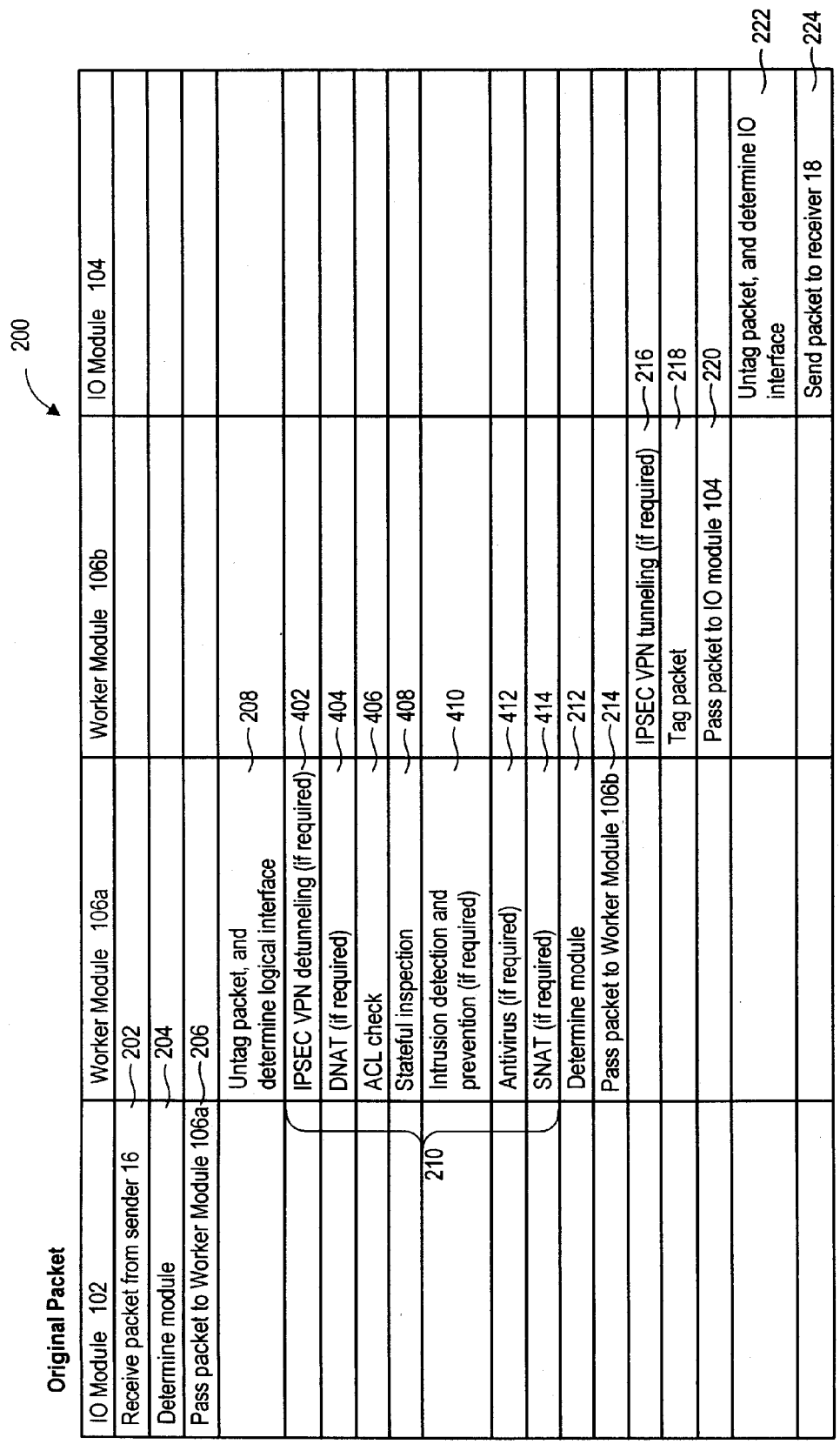
FIG. 3A illustrates a method for processing network traffic data in accordance with other embodiments.

In other embodiments, instead of, or in addition to, those described previously, worker module 106a may also perform other functions. For example, as shown in FIG. 3A, module 106a performs IPSEC (Internet Security Protocol) VPN tunneling or detunneling (Step 402), DNAT (Step 404), firewall policy (such as access control list (ACL) check) (Step 406), stateful inspection (Step 408), intrusion detection and prevention (Step 410), antivirus (Step 412), and SNAT (Step 414) in accordance with other embodiments. To illustrate, assuming that the received packet has the configuration (a-b) in which "a" represents the source of the packet and "b" represents the destination of the packet, the IPSEC tunneling process adds an IPSEC header to the packet and encrypt the packet. For example, the IPSEC tunneling may change the received packet from (a-b) to (X-Y|a-b). IPSEC detunneling is a process in which the IPSEC header is removed and the packet is decrypted. For example, if an IPSEC tunneled packet is (X-Y|a-b), the IPSEC detunneling process changes the tunneled packet to (a-b). In the SNAT process, the source header is changed. For example, in the SNAT process, packet (a-b) may be changed to (e-b). In the DNAT process, the destination header is changed. For example, in the DNAT process, packet (b-e) may be changed to (b-a).

In the illustrated embodiments, all worker modules 106 are configured such that they can perform the same functions. As such, in the event that the packet is passed to worker module 106c (instead of worker module 106a), for example, worker module 106c can be used to process the packet. In other embodiments, the worker modules 106 can be configured to perform different functions. In further embodiments, a first group of worker modules 106 can be configured to perform a first set of functions, and a second group of worker modules 106 can be configured to perform a second set of functions that are different from the first set.

Returning to FIG. 2A, after step 210, worker module 106a then determines which worker module to pass the packet for further processing (Step 212). In the illustrated embodiments, the distribution algorithm discussed previously with reference to Step 204 may be used again to determine the next worker module 106 to which the packet is passed. Step 212 is desirable because in some embodiments, an IP address associated with the packet may change while being processed by system 10. For example, a firewall may be configured to change source IP address and/or destination IP address based on a configuration of the packet in accordance with a prescribed policy. In such cases, if the packet matches the corresponding configuration, the IP address(es) associated with the packet is then changed as prescribed by the policy.

In the event that the IP address associated with the packet has changed, the above-described distribution algorithm can be used again to determine which worker module 106 to pass the packet for further processing. For example, if the calculated value V has been changed (e.g., resulted from a change of an IP address) from "99" to "100," then the value V=100 can be used to calculate a new assignment number (e.g., by dividing V=100 by the number of worker modules 106=3, to obtain remainder R=1). The assignment number, which is "1" in the example, is then used to determine the next worker module 106 to which the packet is passed. Following the above example, since worker module 106b has identification number "1," the packet will be passed from worker module 106a to worker module 106b. In other embodiments, the packet may be passed to another one of worker modules 106, depending on IP address and the distribution algorithm used. In the illustrated embodiments, the packet is transmitted from worker module 106a to switch module 107 via switch port 154a, and is passed from switch port 154a to worker module 106b via switch port 154b (Step 214).

After receiving the packet from worker module 106a, worker module 106b further processes the packet (Step 216). For example, worker module 106b may perform source verification, destination verification, user authentication, anti-virus, content scanning, content detection, intrusion detection, or other functions associated with policy enforcement. In other embodiments, instead of, or in addition to, those described previously, worker module 106b may also perform other functions. For example, in other embodiments, worker module 106b may classify the packet based on the step of processing. Also, in other embodiments, worker module 106b may perform IPSEC VPN tunneling (FIG. 3A).

Worker module 106b then tags the packet (Step 218), and passes the packet to IO module 104 (Step 220). In particular, the tagged packet is passed from data port 140b of worker module 106b to distribution port 120b of IO module 104 (e.g., via a point-to-point link). In other embodiments, instead of passing the packet to IO module 104, if further processing is needed, worker module 106b can pass the packet to a third worker module for further processing. For example, a distribution algorithm (such as the example of distribution algorithm discussed previously) can be used to determine which other worker module 106 can be used to further process the packet. In some embodiments, the same distribution algorithm is used to pass packet from IO module 102 to a worker module 106, and from one worker module 106 (e.g., 106a) to another worker module 106 (e.g., 106b). In other embodiments, the distribution algorithm used to pass packet from IO module 102 to worker module 106 may be different from the distribution algorithm used to pass packet between worker modules 106.

After IO module 104 receives the packet, IO module 104 untags the packet and determines an IO interface (Step 222). IO module 104 then passes the packet to receiver 18 (Step 224). In some embodiments, if worker module 106 determines that the packet is an undesirable network traffic data (e.g., a virus), then in Step 224, instead of passing the packet to receiver 18, system 10 transmits a message or a warning signal to receiver 18, indicating that undesirable data has been detected.

In other embodiments, system 10 can perform methods that are different from that discussed previously to process network traffic data. For example, in other embodiments, method 200 may not include one or more steps (such as the tagging and un-tagging steps) discussed previously. Also, in other embodiments, one or more steps of method 200 described previously with reference to a module may be performed by another module instead. For example, in other embodiments, step 212 of classifying packet may be performed by worker module 106b (instead of by worker module 106a). In further embodiments, any of the steps 202-224 discussed previously may be performed as a series of sub-steps, which may be performed by one or more modules (e.g., IO module 102, worker module(s) 106, and IO module 104).

FIG. 2B illustrates a method 240 for processing network traffic data using system 10 in accordance with other embodiments. In particular, method 240 is used to process network traffic data transmitted from receiver 18 to sender 16. In the illustrated embodiments, the network traffic data includes content requested by sender 16, and the network traffic data is sent by receiver 18 in response to a content request (such as the example discussed with reference to method 200). However, it should be understood by those skilled in the art that method 240 of FIG. 2B can be used to process other types of network traffic data.

First, IO module 104 of system 10 receives a packet (an example of network traffic data) from receiver 18 via IO port 118 (Step 242). After packet has been received, IO module 104 then determines which worker module 106 to pass the packet for processing (Step 244), and passes the packet to worker module 106 (Step 246). The packet may be tagged before it is passed to worker module 106.

In the illustrated embodiments, IO module 104 determines which worker module 106 to pass the packet based on the path from which the original packet is transmitted in method 200 (FIG. 2A). Various techniques can be used to keep track with the path of the original packet in method 200. In some embodiments, system 10 creates a record of the path traveled by the original packet (e.g., during method 200), and transmits the reply packet back the same path from which the original packet comes based on the record. For example, if an original packet is exchanged from worker module 106a to worker module 106b, worker module 106b then creates a record of such an exchange. In such cases, when worker module 106b receives a reply packet (e.g., in response to the original packet), worker module 106b then looks up the record (e.g., by accessing a log) to determine that the original packet comes from worker module 106a, and passes the reply packet to worker module 106a based on the record. Following the above example, because the original packet was passed from worker module 106b to IO module 104 in method 200, (FIG. 2A), the reply packet is passed from IO module 104 back to worker module 106b in step 244. In particular, the packet is passed from the distribution port 120b of IO module 104 to data port 140b of worker module 106b. In other embodiments, instead of using a previous path to pass the packet, IO module 104 can use the above described distribution algorithm to calculate a value, which is then used to determine which worker module 106 to pass for processing the packet. Steps 242-246 are similar to steps 202-206 discussed previously with reference to method 200.

Figure 3B:
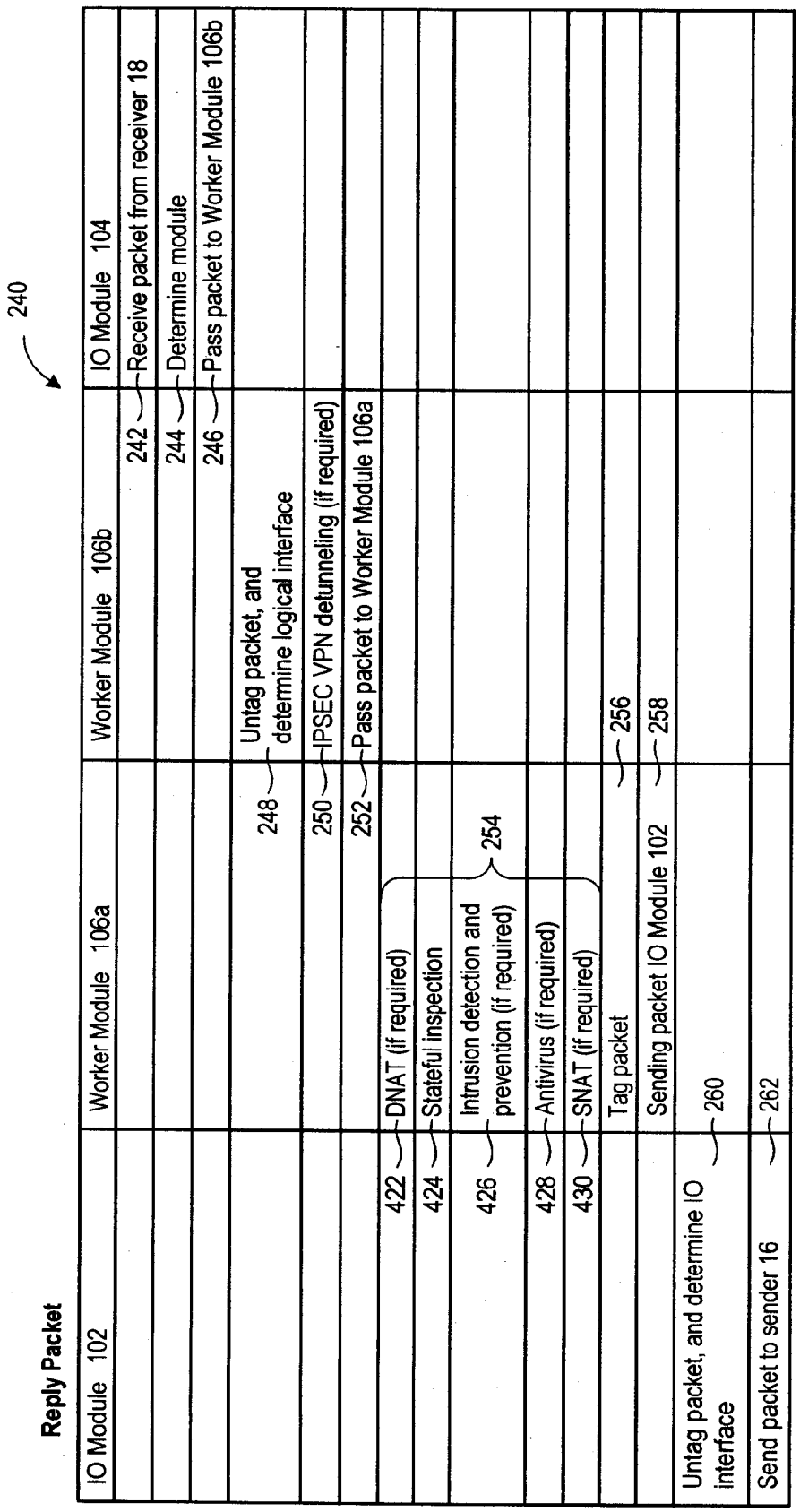
FIG. 3B illustrates a method for processing network traffic data in accordance with other embodiments.

After worker module 106b receives the packet, worker module 106b untags the packet and determines a logical interface (Step 248). Worker module 106b next processes the packet (Step 250). In particular, worker module 106b can perform any of the functions described herein. For example, in some embodiments, worker module 106b performs IPSEC VPN detunneling (FIG. 3B). After the packet is processed, worker module 106b passes the packet to another worker module for further processing (Step 252). In the illustrated embodiments, the packet is passed from worker module 106b to worker module 106a because this is the path from which the original packet is transmitted in method 200 (FIG. 2A). In particular, the packet is transmitted from worker module 106b to switch module 107 via switch port 154b, and is passed from switch module 107 to worker module 106a via switch port 154a. In other embodiments, worker module 106b can use the above described distribution algorithm to calculate a value, which is then used to determine which worker module 106 to pass for processing the packet. In such cases, the worker module 106 to pass the packet for processing will depend on the distribution algorithm being employed. Steps 248-252 are similar to steps 208, 210, and 214, respectively, discussed previously with reference to method 200.

After worker module 106a received the packet, worker module 106a processes the packet (Step 254). Worker module 106a may perform any of the functions described herein. For example, as shown in FIG. 3B, module 106a performs DNAT (Step 422), stateful inspection (Step 424), intrusion detection and prevention (Step 426), antivirus (Step 428), and SNAT (Step 430) in accordance with other embodiments.

Worker module 106a then tags the packet (Step 256), and passes the packet to IO module 102 (Step 258). In the illustrated embodiments, the packet is passed from worker module 106a to IO module 102 because this is the path from which the original packet is transmitted in method 200 (FIG. 2A). In other embodiments, instead of passing the packet to IO module 102, if further processing is needed, worker module 106a can use the above described distribution algorithm to calculate a value, which is then used to determine which worker module 106 to pass for further processing the packet. Steps 254-258 are similar to steps 216-220 discussed previously with reference to method 200.

After IO module 102 receives the packet, IO module 102 untags the packet and determines an IO interface (Step 260), and sends the packet to sender 16 (Step 262). Steps 260 and 262 are similar to steps 222 and 224 discussed previously with reference to method 200.

In other embodiments, system 10 can perform methods that are different from that discussed previously to process network traffic data. For example, in other embodiments, method 240 may not include one or more steps (such as the tagging and un-tagging steps) discussed previously. Also, in other embodiments, one or more steps of method 240 described previously with reference to a module may be performed by another module instead. For example, in other embodiments, step 254 of processing packet may be performed by another worker module 106 (instead of by worker module 106a). In further embodiments, any of the steps 242-262 discussed previously may be performed as a series of sub-steps, which may be performed by one or more modules (e.g., IO module 102, worker module(s) 106, and IO module 104).

In the above embodiments, packet is passed from one worker module 106 to another worker module 106 for processing. However, in other embodiments, a packet may not be passed from one worker module 106 to another worker module 106, depending on a result of a distribution algorithm employed. For example, if the above described remainder-algorithm is employed, it is possible that a result of the algorithm may prescribe the same worker module 106 to continue processing a packet. In such cases, the packet is not passed from the worker module 106 to another worker module 106.

Figure 4A:
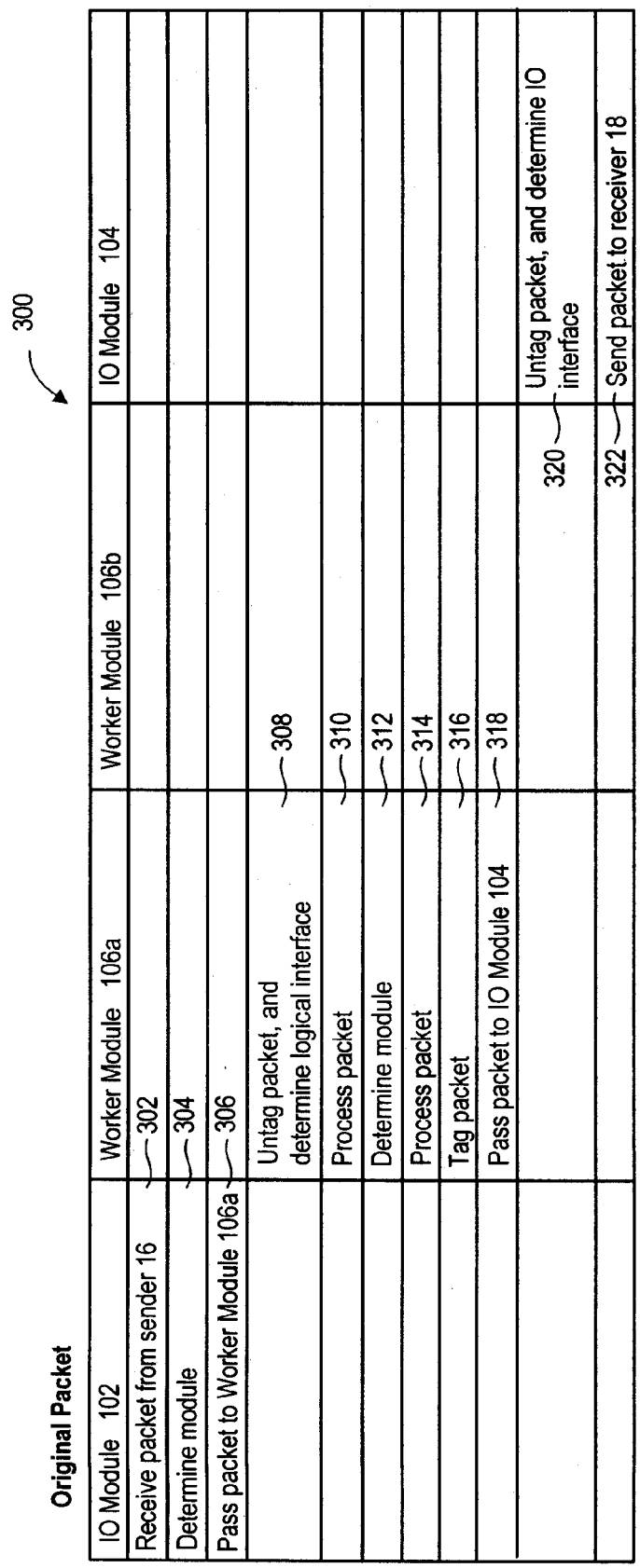
FIG. 4A illustrates a method for processing network traffic data in accordance with other embodiments.

FIG. 4A illustrates a method 300 for processing network traffic data using system 10 in accordance with other embodiments. In particular, method 300 is used to process network traffic data transmitted from sender 16 to receiver 18. First, IO module 102 of system 10 receives a packet (an example of network traffic data) from sender 16 via IO port 108 (Step 302). For the purpose of the following discussion, it is assumed that the packet received is associated with a request for content, such as a web page requested by sender 16. However, it should be understood by those skilled in the art that method 300 of FIG. 4A can be used to process other types of network traffic data. After packet has been received, IO module 102 then determines which worker module 106 to pass the packet for processing (Step 304).

Various distribution algorithms may be used to determine which of the worker modules 206 to pass the packet. For example, in some embodiments, system 10 determines which of the worker modules 206 to pass the packet based on one or more IP address(es) associated with the packet, as discussed previously. For the purpose of the following discussion, it will be assumed that the packet is passed to worker module 106a. However, it should be understood by those skilled in the art that the packet can be passed to another worker module 206, depending on the distribution algorithm used.

Next, the IO module 102 passes the packet to worker module 106a (Step 306). The packet may be tagged before it is passed to worker module 106a.

After worker module 106a receives the tagged packet, worker module 106a then untags the packet (e.g., by removing the tag attached to the packet), and determines a logical interface (Step 308). Worker module 106a then processes the packet (Step 310). For example, worker module 106a may perform source verification, destination verification, user authentication, anti-virus, content scanning, content detection, intrusion detection, or other functions associated with policy enforcement. In other embodiments, instead of, or in addition to, those described previously, worker module 106a may also perform other functions. Worker module 106a may also classify the packet based on a result of the processing from Step 210. Steps 302, 304, 306, 308, 310 are similar to steps 202, 204, 206, 208, 210, 212 of method 200, and therefore, would not be described in details.

Figure 5A:
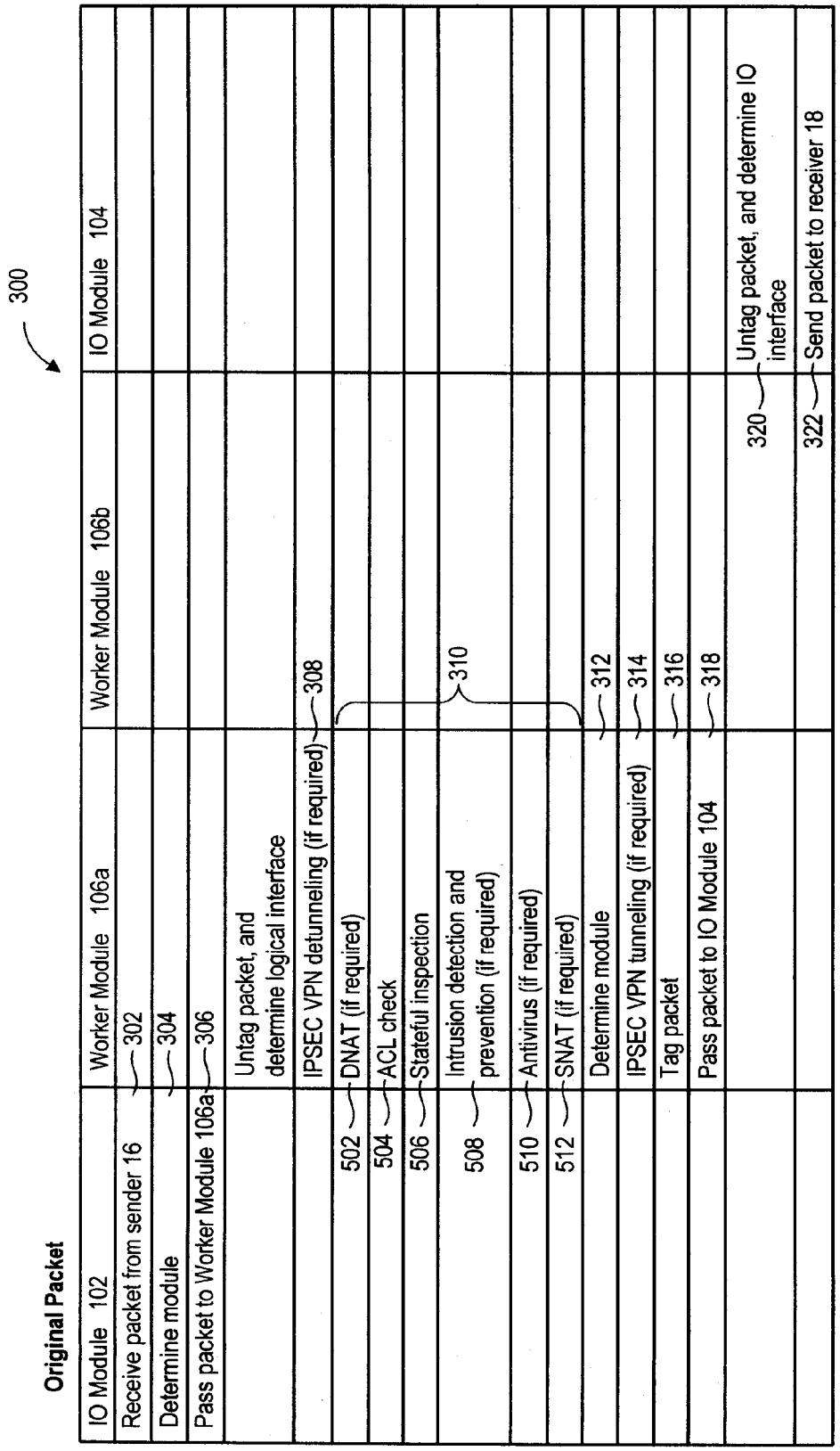
FIG. 5A illustrates a method for processing network traffic data in accordance with other embodiments.

In other embodiments, instead of, or in addition to, those described previously, worker module 106a may also perform other functions. For example, as shown in FIG. 5A, module, 106a performs DNAT (Step 520), ACL check (Step 504), stateful inspection (Step 506), intrusion detection and prevention (Step 508), antivirus (Step 510), and SNAT (Step 512) in accordance with other embodiments.

After step 310, worker module 106a determines which worker module 106 to pass the packet for further processing (Step 312). Again, the above distribution algorithm can be used for such purpose. For the purpose of discussion, it is assumed that the calculated remainder R=0. Since worker module 106a has identification number "0" that is associated with R=0, worker module 106a is continued to be used to process the packet. As such, unlike method 200, the packet is not passed from worker module 106a to another worker module 106 for further processing. Instead, worker module 106a itself performs further processing for the packet (Step 314), such as performs IPSEC VPN tunneling.

After the packet has been processed, worker module 106a tags the packet (Step 316), and passes the packet to IO module 104 (Step 318). In the illustrated embodiments, the packet is transmitted from data port 140a of worker module 106a to distribution port 120a of IO module 104. In other embodiments, instead of sending the packet to IO module 104, if further processing is needed, the above-described distribution algorithm may be used to determine which worker module 106 to pass for further processing the packet.

After IO module 104 receives the packet from worker module 106a, IO module 104 untags the packet and determines an IO interface (Step 320). IO module 104 then sends the packet to receiver 18 (Step 322). Steps 320 and 322 are similar to steps 222 and 224, respectively, discussed previously with reference to method 200.

In other embodiments, system 10 can perform methods that are different from that discussed previously to process network traffic data. For example, in other embodiments, method 300 may not include one or more steps (such as the tagging and un-tagging steps) discussed previously. Also, in other embodiments, one or more steps of method 300 described previously with reference to a module may be performed by another module instead. In further embodiments, any of the steps 302-322 discussed previously may be performed as a series of sub-steps, which may be performed by one or more modules (e.g., IO module 102, worker module(s) 106, and IO module 104).

Figure 4B:
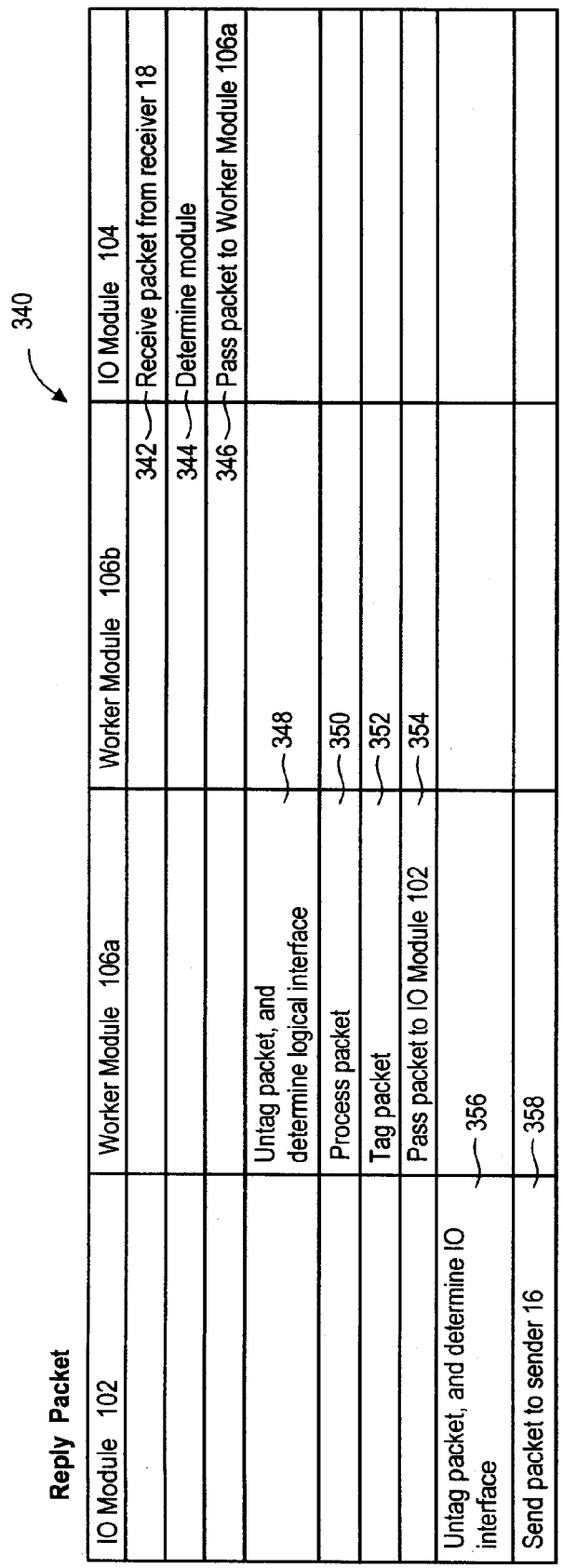
FIG. 4B illustrates a method for processing network traffic data in accordance with other embodiments.

FIG. 4B illustrates a method 340 for processing network traffic data using system 10 in accordance with other embodiments. In particular, method 340 is used to process network traffic data transmitted from receiver 18 to sender 16. In the illustrated embodiments, the network traffic data includes content requested by sender 16, and the network traffic data is sent by receiver 18 in response to a content request (such as the example discussed with reference to method 300). However, it should be understood by those skilled in the art that method 340 of FIG. 4B can be used to process other types of network traffic data.

First, IO module 104 of system 10 receives a packet (an example of network traffic data) from receiver 18 via IO port 118 (Step 342). After packet has been received, IO module 104 then determines which worker module 106 to pass the packet for processing (Step 344), and passes the packet to worker module 106 (Step 346). The packet may be tagged before it is transmitted to worker module 106. In the illustrated embodiments, the packet is passed from IO module 104 to worker module 106a because this is the path from which the original packet is transmitted in method 300 (FIG. 4A). In particular, the tagged packet is passed from the distribution port 120a of IO module 104 to data port 140a of worker module 106a. In other embodiments, IO module 104 can use the above described distribution algorithm to calculate a value, which is then used to determine which worker module 106 to pass for processing the packet. In such cases, the worker module 106 to pass the packet for processing will depend on the distribution algorithm being employed. After worker module 106a received the packet, worker module 106a untags the packet and determines a logical interface (Step 348).

Worker module 106a next processes the packet (Step 350). For example, worker module 106a may perform source verification, destination verification, user authentication, anti-virus, content scanning, content detection, intrusion detection, or other functions associated with policy enforcement. In other embodiments, instead of, or in addition to, those described previously, worker module 106a may also perform other functions. For example, in other embodiments, module 106a performs IPSEC VPN detunneling (Step 522), DNAT (Step 524), stateful inspection (Step 526), intrusion detection and prevention (Step 528), antivirus (Step 530), and SNAT (Step 532), and IPSEC VPN tunneling (Step 534) (FIG. 5B). Steps 342, 344, 346, 348, 350, 352 are similar to respective steps 242, 244, 246, 248, 250, 252 of method 240, and therefore, would not be described in details.

Next, worker module 106a tags the packet (Step 352), and passes the packet to IO module 102 (Step 354). In the illustrated embodiments, the packet is passed from worker module 106a to IO module 102 because this is the path from which the original packet is transmitted in method 300 (FIG. 4A). In particular, the packet is transmitted from data port 140a of worker module 106a to distribution port 110a of IO module 102. In other embodiments, if further processing is needed, worker module 106a can use the above described distribution algorithm to calculate a value, which is then used to determine which worker module 106 to pass for further processing the packet. In such cases, the worker module 106 to pass the packet for processing will depend on the distribution algorithm being employed.

After IO module 102 receives the packet from worker module 106a, IO module 102 untags the packet and determines an IO interface (Step 356). IO module 102 then sends the packet to sender 16 (Step 358). Steps 356 and 358 are similar to steps 260 and 262, respectively, discussed previously with reference to method 240.

In other embodiments, system 10 can perform methods that are different from that discussed previously to process network traffic data. For example, in other embodiments, method 340 may not include one or more steps (such as the tagging and un-tagging steps) discussed previously. Also, in other embodiments, one or more steps of method 340 described previously with reference to a module may be performed by another module instead. In further embodiments, any of the steps 342-358 discussed previously may be performed as a series of sub-steps, which may be performed by one or more modules (e.g., IO module 102, worker module(s) 106, and IO module 104).

Although several embodiments of a method for processing network traffic data between sender 16 and receiver 18 have been described, the scope of the invention should not be so limited. In other embodiments, system 10 can be configured to process (e.g., distribute) network traffic data using other algorithms such that network traffic data can be transmitted between sender 16 and receiver 18 in an efficient manner. Also, in other embodiments, one or more steps described previously can be combined with other step(s). In addition, in further embodiments, a method needs not include all of the steps discussed previously.

Although embodiments of system 10 and various methods have been described with reference to processing network traffic data that is associated with web content, it should be understood that the same or similar methods and modules may also be used to pass other content, such as emails (being sent or being received), FTP, HTTP, and any electronic information. In some embodiments, system 10 includes a protocol differentiator (not shown), which examines headers of the network traffic and determines the types of data being passed. System 10 then passes content data based on prescribed protocol for the type of data.

In some embodiments, each type of network traffic data is pre-assigned to a port of a network gateway by a default configuration. For example, HTTP, SMTP, POP, IMAP, and FTP data may each be pre-assigned to be transmitted through a designated port. In such a case, a protocol differentiator can determine a type of content based on an identification of a port transmitting the network content. In other embodiments, protocol differentiator can be configured to scan all available ports in order to determine a type of content being screened.

In some embodiments, system 10 includes a user interface that allows a user to select criteria or parameters for passing network traffic data. For example, system 10 can allow a user to determine which passing protocol/algorithm to use for passing data. For example, the user interface can provide a plurality of passing algorithms (e.g., data passing based on IP address(es), data passing based on available resources, or data passing based on data type) for a user or an administrator to select. In alternative embodiments, the user interface can allow a user to formulate and/or program customized passing protocol. In further embodiments, the user interface can allow a user to select which passing protocol/algorithm to use for a certain type of network data. The user interface can be implemented using a computer in some embodiments.

Computer Architecture

Figure 6:
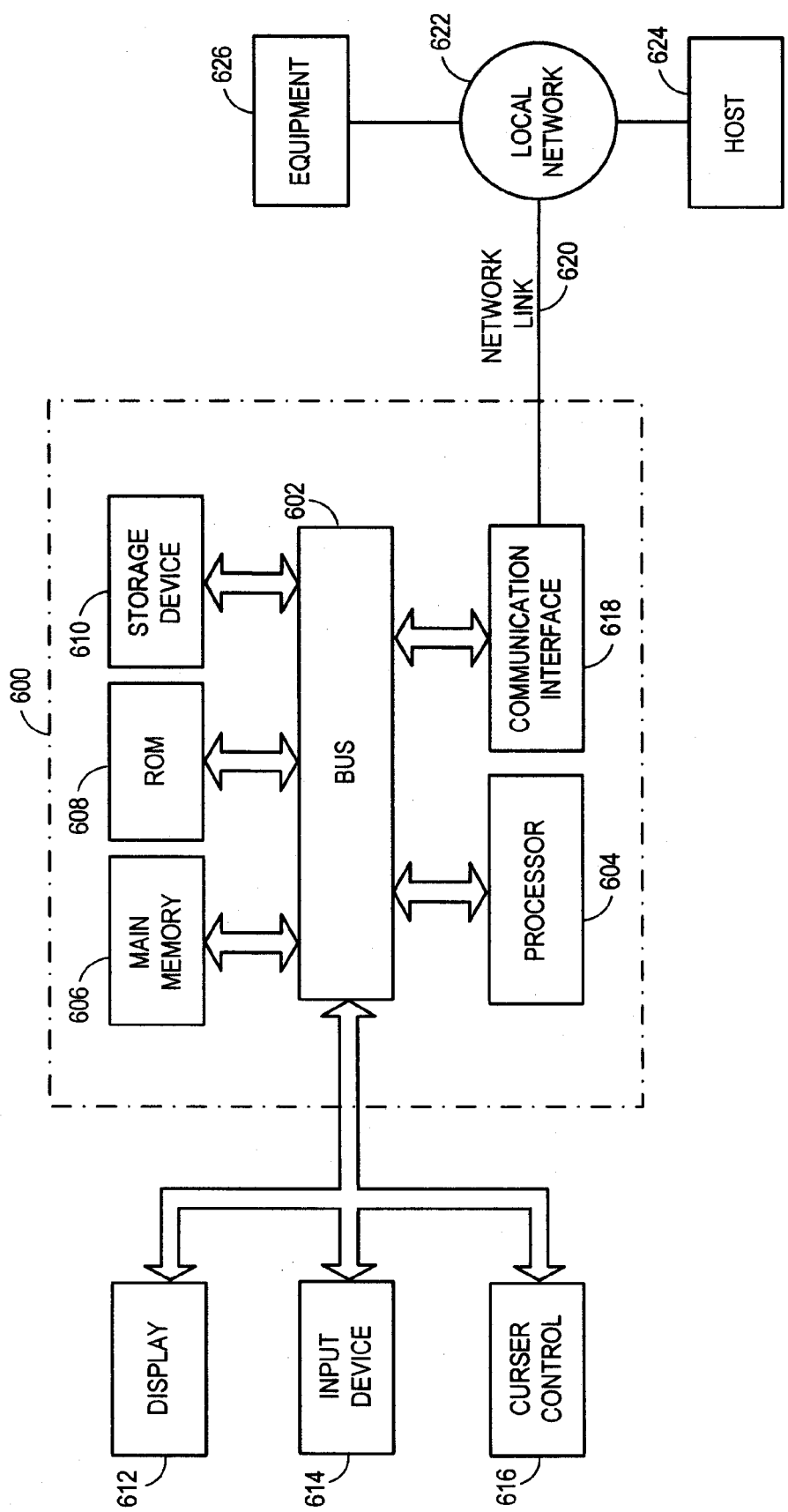
FIG. 6 is a diagram of a computer hardware system with which embodiments described herein can be implemented.

FIG. 6 is a block diagram that illustrates an embodiment of a computer system 600 upon which embodiments described herein may be implemented. For example, computer system 600 may be used to implement one or more of IO module 102, IO module 104, and worker modules 106. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 may further include a read only memory (ROM) 608 or other static storage device(s) coupled to bus 602 for storing static information and instructions for processor 604. A data storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a user. An input device 614, including alphanumeric and other keys, is coupled to bus 602 for communicating information and command selections to processor 604. Another type of user input device is cursor control 616, such as a mouse, a trackball, cursor direction keys, or the like, for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Embodiments described herein are related to the use of computer system 600 for processing network traffic data. According to some embodiments, such use may be provided by computer system 600 in response to processor 604 executing one or more sequences of one or more instructions contained in the main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions. Thus, embodiments described herein are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry data streams representing various types of information.

Network link 620 typically provides data communication through one or more networks to other devices. For example, network link 620 may provide a connection through local network 622 to a host computer 624. Network link 620 may also transmits data between an equipment 626 and communication interface 618. The data streams transported over the network link 620 can comprise electrical, electromagnetic or optical signals. The signals through the various networks and the signals on network link 620 and through communication interface 618, which carry data to and from computer system 600, are exemplary forms of carrier waves transporting the information. Computer system 600 can send messages and receive data, including program code, through the network(s), network link 620, and communication interface 618. Although one network link 620 is shown, in alternative embodiments, communication interface 618 can provide coupling to a plurality of network links, each of which connected to one or more local networks. In some embodiments, computer system 600 may receive data from one network, and transmit the data to another network. Computer system 600 may process and/or modify the data before transmitting it to another network.

Although particular embodiments have been shown and described, it will be understood that they are not intended to limit the present inventions, and it will be obvious to those skilled in the art that various changes and modifications may be made. The specification and drawings are, accordingly, to be regarded in an illustrative rather than restrictive sense. The present inventions are intended to cover alternatives, modifications, and equivalents, which may be included within the spirit and scope of the present inventions as defined by the claims.

What is claimed:

1. A method for processing network traffic data, comprising:
   receiving network traffic data; and
   passing the network traffic data to one of a plurality of worker modules for processing the network traffic data;
   wherein the step of passing is performed based at least in part on a quantity of the worker modules; and
   wherein each of the worker modules has an identification number, and the network traffic data is passed based on a matching between a value and the identification number of one of the worker modules, the value obtained using at least an IP address associated with a receiver of the network traffic data.

2. The method of claim 1, wherein the network traffic data is passed based on the value obtained from a process, the process including:
   dividing a number by the quantity of the worker modules; and determining a remainder based on a result from the dividing.

3. The method of claim 2, wherein the number is calculated using the IP addresses associated with the receiver of the network traffic data, and an IP address associated with a sender of the network traffic data.

4. The method of claim 2, wherein the number is obtained by adding the IP address associated with the sender of the network traffic data, and the IP address associated with the receiver of the network traffic data.

5. The method of claim 1, further comprising using the one of the plurality of worker modules to perform stateful inspection, intrusion detection, or antivirus.

6. The method of claim 1, wherein the quantity is determined by a system administrator.

7. The method of claim 1, wherein the quantity is determined automatically by a processor.

8. The method of claim 7, further comprising mapping an IO port from which the network traffic data is received with a logical interface of the one of the plurality of worker modules.

9. The method of claim 1, further comprising tagging the network traffic data.

10. The method of claim 1, further comprising passing the network traffic data from the one of the plurality of worker modules to another one of the plurality of worker modules.

11. The method of claim 10, wherein the step of passing the network traffic data from the one of the plurality of worker modules to another one of the plurality of worker modules is performed based on the value.

12. The method of claim 1, wherein the step of passing is performed by an IO module.

13. The method of claim 1, wherein the step of passing is performed by another one of the plurality of the worker modules.

14. A system for processing network traffic data, comprising:
    means for receiving network traffic data; and
    means for passing the network traffic data to one of a plurality of worker modules for processing the network traffic data;
    wherein the means for passing is configured to perform the step of passing based at least in part on a quantity of the worker modules; and
    wherein each of the worker modules has an identification number, and the means for passing passes the network traffic data based on a matching between a value and the identification number of one of the worker modules, the value obtained using an IP address associated with a receiver of the network traffic data.

15. A computer product having a set of stored instructions, an execution of which causes a process to be performed, the process comprising:
    receiving network traffic data; and
    passing the network traffic data to one of a plurality of worker modules for processing the network traffic data;
    wherein the step of passing is performed based at least in part on a quantity of the worker modules; and
    wherein each of the worker modules has an identification number, and the network traffic data is passed based on a matching between a value and the identification number of one of the worker modules, the value obtained using an IP address associated with a receiver of the network traffic data.

16. A method for processing network traffic data, comprising:
    receiving network traffic data;
    passing the network traffic data to one of a plurality of worker modules for processing the network traffic data; and
    tagging the network traffic data for mapping a logical interface at the one of the plurality of worker modules with a port at an IO module;
    wherein the step of passing is performed based at least in part on a number associated with a first IP address.

17. The method of claim 16, wherein the number is obtained using the first IP address and a second IP address.

18. The method of claim 17, wherein the first IP address is associated with a sender of the network traffic data, and the second IP address is associated with a receiver of the network traffic data.

19. The method of claim 16, wherein the number is obtained from a process that includes:
    adding a first IP address to a second IP address to obtain an aggregate value;
    dividing the aggregate value by a quantity of the worker modules; and
    obtaining a remainder based on a result from the dividing.

20. The method of claim 16, further comprising mapping the IO port with the logical interface of the one of the plurality of worker modules.

21. The method of claim 16, further comprising passing the network traffic data from the one of the plurality of worker modules to another one of the plurality of worker modules.

22. The method of claim 21, wherein the step of passing the network traffic data from the one of the plurality of worker modules to another one of the plurality of worker modules is performed based on another number associated with a second IP address.

23. The method of claim 16, wherein the step of passing is performed by the IO module.

24. The method of claim 16, wherein the step of passing is performed by another one of the plurality of the worker modules.

25. A system for processing network traffic data, comprising:
    means for receiving network traffic data;
    means for passing the network traffic data to one of a plurality of worker modules for processing the network traffic data; and
    means for tagging the network traffic data for mapping a logical interface at the one of the plurality of worker modules with a port at an IO module;
    wherein the means for passing is configured to perform the step of passing based at least in part on a number associated with a first IP address.

26. A computer product having a set of stored instructions, an execution of which causes a process to be performed, the process comprising:
    receiving network traffic data;
    passing the network traffic data to one of a plurality of worker modules for processing the network traffic data; and
    tagging the network traffic data for mapping a logical interface at the one of the plurality of worker modules with a port at an IO module;
    wherein the step of passing is performed based at least in part on a number associated with a first IP address.

27. A system for processing network traffic data, comprising:
    a first IO module;
    a second IO module;

a first worker module coupled to the first and second IO modules;
a second worker module coupled to the first and second IO modules; and
a switch module coupled to the first IO module, the second IO module, the first worker module, and the second worker module;
wherein the first IO module comprises a first IO port, and a first distribution port communicatively coupled to the first worker module; and
wherein the first worker module comprises a first data port and a second data port, the first distribution port of the first IO module communicatively coupled to the first data port of the first worker module, and the second data port of the first worker module communicatively coupled to a distribution port of the second IO module.

28. The system of claim 27, wherein the first distribution port of the first IO module is communicatively coupled to the first data port of the first worker module via a point-to-point link.

29. The system of claim 27, wherein the first IO module comprises a second distribution port communicatively coupled to the second worker module.

30. The system of claim 27, wherein the first IO module is configured to pass network traffic data to the first or the second worker module based on a number associated with an IP address.

31. The system of claim 30, wherein the number is obtained using a sender's IP address and a receiver's IP address.

32. The system of claim 27, wherein the first IO module is configured to pass network traffic data to the first or the second worker module based on a number, the number obtained by:
adding a sender's IP address to a receiver's IP address to obtain an aggregate value; and
determining a remainder by dividing the aggregate value by a quantity of worker modules that include the first and second worker modules.

33. The system of claim 32, wherein the first worker module has an identification number, and the first IO module is configured to pass the network traffic data based on a matching between the number and the identification number.

34. The system of claim 27, wherein the first IO module is configured to tag the network traffic data.

35. The system of claim 34, wherein a tagged portion of the tagged network traffic data is for mapping a logical interface at the one of the first and second worker modules with the first IO port.

36. The system of claim 27, wherein the first worker module is configured to tag the network traffic data.

37. The system of claim 27, wherein the first IO module and second IO module are separate components.

38. A system for processing network traffic data, comprising:
a first IO module comprising a plurality of ports;
a second IO module;
a first worker module coupled to the first and second IO modules;
a second worker module coupled to the first and second IO modules; and
a switch module coupled to the first IO module, the second IO module, the first worker module, and the second worker module;
wherein the first IO module is configured to pass network traffic data to the first or the second worker module based on a number, the number obtained by:
adding a sender's IP address to a receiver's IP address to obtain an aggregate value; and
determining a remainder by dividing the aggregate value by a quantity of worker modules that include the first and second worker modules;
wherein the first worker module has an identification number, and the first IO module is configured to pass the network traffic data based on a matching between the number and the identification number.

39. A system for processing network traffic data, comprising:
a first IO module comprising a plurality of ports;
a second IO module;
a first worker module coupled to the first and second IO modules;
a second worker module coupled to the first and second IO modules; and
a switch module coupled to the first IO module, the second IO module, the first worker module, and the second worker module;
wherein the first IO module is configured to tag the network traffic data, and a tagged portion of the tagged network traffic data is for mapping a logical interface at the one of the first and second worker modules with one of the ports.

40. The system of claim 39, wherein the switch module is configured for passing data between the first and the second worker modules.

41. The system of claim 39, wherein the plurality of ports comprises a first IO port, and a first distribution port communicatively coupled to the first worker module.

42. The system of claim 41, wherein the plurality of ports comprises a second distribution port communicatively coupled to the second worker module.

43. The system of claim 39, wherein the first IO module is configured to pass network traffic data to the first or the second worker module based on a number associated with an IP address.

44. The system of claim 43, wherein the number is obtained using a sender's IP address and a receiver's IP address.

45. The system of claim 39, wherein the first IO module and the second IO module are separate components.

* * * * *

(12) EX PARTE REEXAMINATION CERTIFICATE (10839th)

United States Patent
Li et al.

(10) Number: US 7,333,430 C1
(45) Certificate Issued: Mar. 31, 2016

(54) SYSTEMS AND METHODS FOR PASSING NETWORK TRAFFIC DATA

(75) Inventors: Hongwei Li, Burnaby (CA); Michael Xie, Palo Alto, CA (US); Junyin Li, Burnaby (CA); Guangwen Li, Inner Mongolia (CN)

(73) Assignee: Fortinet, Inc.

Reexamination Request:
No. 90/013,532, Jun. 18, 2015

Reexamination Certificate for:
Patent No.: 7,333,430
Issued: Feb. 19, 2008
Appl. No.: 11/176,071
Filed: Jul. 6, 2005

(51) Int. Cl.
*H04L 12/701* (2013.01)
*H04L 12/773* (2013.01)

(52) U.S. Cl.
CPC ............... *H04L 45/00* (2013.01); *H04L 45/60* (2013.01)

(58) Field of Classification Search
None
See application file for complete search history.

(56) References Cited

To view the complete listing of prior art documents cited during the proceeding for Reexamination Control Number 90/013,532, please refer to the USPTO's public Patent Application Information Retrieval (PAIR) system under the Display References tab.

*Primary Examiner* — Mary Steelman

(57) ABSTRACT

A method for processing network traffic data includes receiving network traffic data, and passing the network traffic data to one of a plurality of worker modules for processing the network traffic data, wherein the step of passing is performed based at least in part on a quantity of the worker modules, and/or a number associated with a first IP address. A system for processing network traffic data includes a first IO module, a second IO module, a first worker module coupled to the first and second IO modules, a second worker module coupled to the first and second IO modules, and a switch module coupled to the first IO module, the second IO module, the first worker module, and the second worker module.

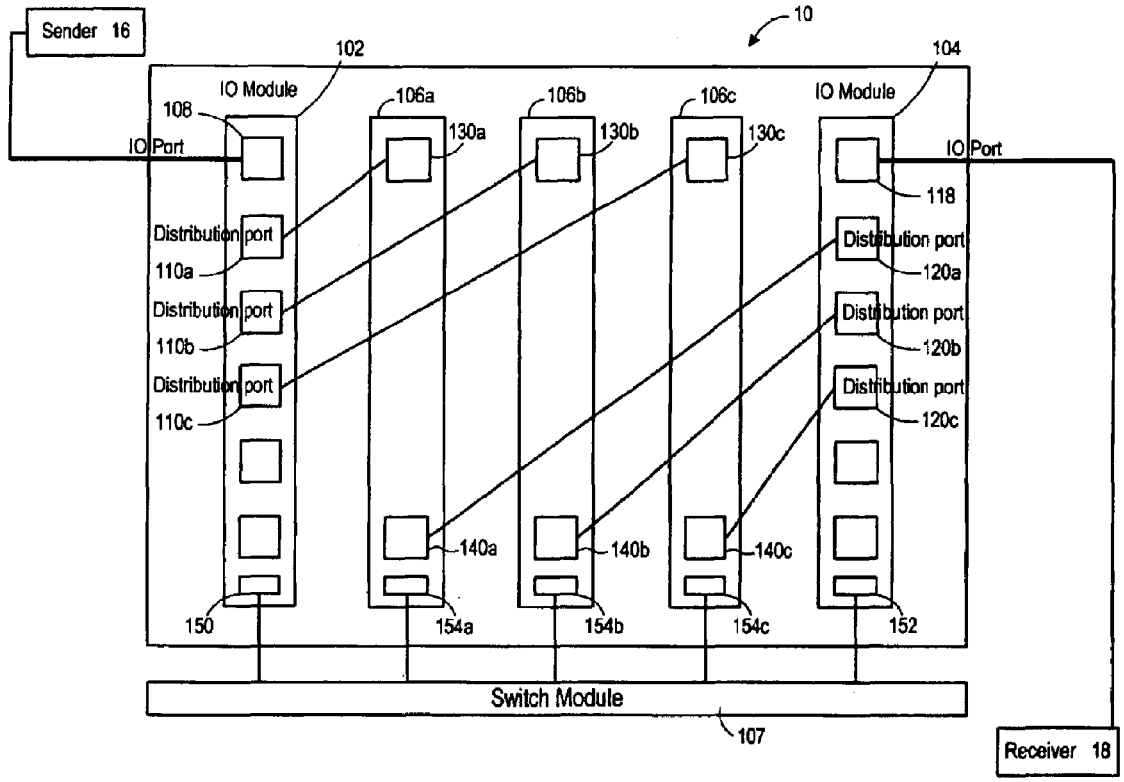

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 5, 9, 14 and 15 is confirmed.

New claims 46-55 and 56 are added and determined to be patentable.

Claims 2-4, 6-8, 10-13, 16-44 and 45 were not reexamined.

46. *A method for processing network traffic data, comprising:*
   *receiving network traffic data; and*
   *before permitting the network traffic data to be forwarded to a receiver to which the network traffic data was originally addressed by a sender of the network traffic data, passing the network traffic data to one of a plurality of worker modules for processing the network traffic data;*
   *wherein the step of passing is performed based at least in part on a quantity of the plurality of worker modules; and*
   *wherein each of the plurality of worker modules has an identification number, and the network traffic data is passed based on a value matching the identification number of one of the plurality of worker modules, the value obtained using at least a destination Internet Protocol (IP) address contained within the network traffic data that is associated with a receiver to which the network traffic data was originally addressed.*

47. *The method of claim 46, wherein the network traffic data is passed based on the value obtained from a process, the process including determining a remainder that results from dividing a number derived from at least the destination IP address by the quantity.*

48. *The method of claim 47, wherein the number is calculated using the destination IP address and a source IP address contained within the network traffic data that is associated with the sender.*

49. *The method of claim 48, wherein the number is obtained by adding the source IP address and the destination IP address.*

50. *The method of claim 46, further comprising using the one of the plurality of worker modules to perform stateful inspection, intrusion detection, or antivirus.*

51. *A method comprising:*
   *receiving, by an Input/Output (IO) module of a network gateway device, network traffic data in a form of a plurality of Internet Protocol (IP) packets, wherein each IP packet of the plurality of IP packets includes a source IP address of a sender of the IP packet and a destination IP address of a receiver of the IP packet;*
   *for each IP packet of the plurality of IP packets, based on a result of an assignment process for the IP packet, passing, by the IO module, the IP packet to an assigned worker module of a plurality of worker modules within the network gateway device for performance of one or more policy enforcement processes before the IP packet is permitted to be forwarded to the receiver, wherein each of the plurality of worker modules has an identification number;*
   *wherein the assignment process includes determining a remainder (R) that would result from dividing a value (V), which is based on one or both of the source IP address and the destination IP address of the IP packet, by a number (Q), which represents a quantity of the plurality of worker modules;*
   *wherein said passing is performed based on R being numerically equal to the identification number of the assigned worker module; and*
   *determining, by the assigned worker module, whether it is permissible to forward the IP packet to the receiver by performing the one or more policy enforcement processes on the IP packet.*

52. *The method of claim 51, wherein the one or more policy enforcement processes comprise performing verification of the source IP address of the IP packet.*

53. *The method of claim 51, wherein the one or more policy enforcement processes comprise performing verification of the destination IP address of the IP packet.*

54. *The method of claim 51, wherein the one or more policy enforcement processes comprise performing content scanning on the IP packet or on a session with which the IP packet is associated.*

55. *The method of claim 51, wherein the one or more policy enforcement processes comprise performing virus scanning on the IP packet or on a session with which the IP packet is associated.*

56. *The method of claim 51, wherein the one or more policy enforcement processes comprise performing intrusion detection on the IP packet or on a session with which the IP packet is associated.*

\* \* \* \* \*